Oct. 25, 1938.    V. W. KLIESRATH ET AL    2,134,519
DECLUTCHING MECHANISM
Filed July 23, 1931    2 Sheets-Sheet 1
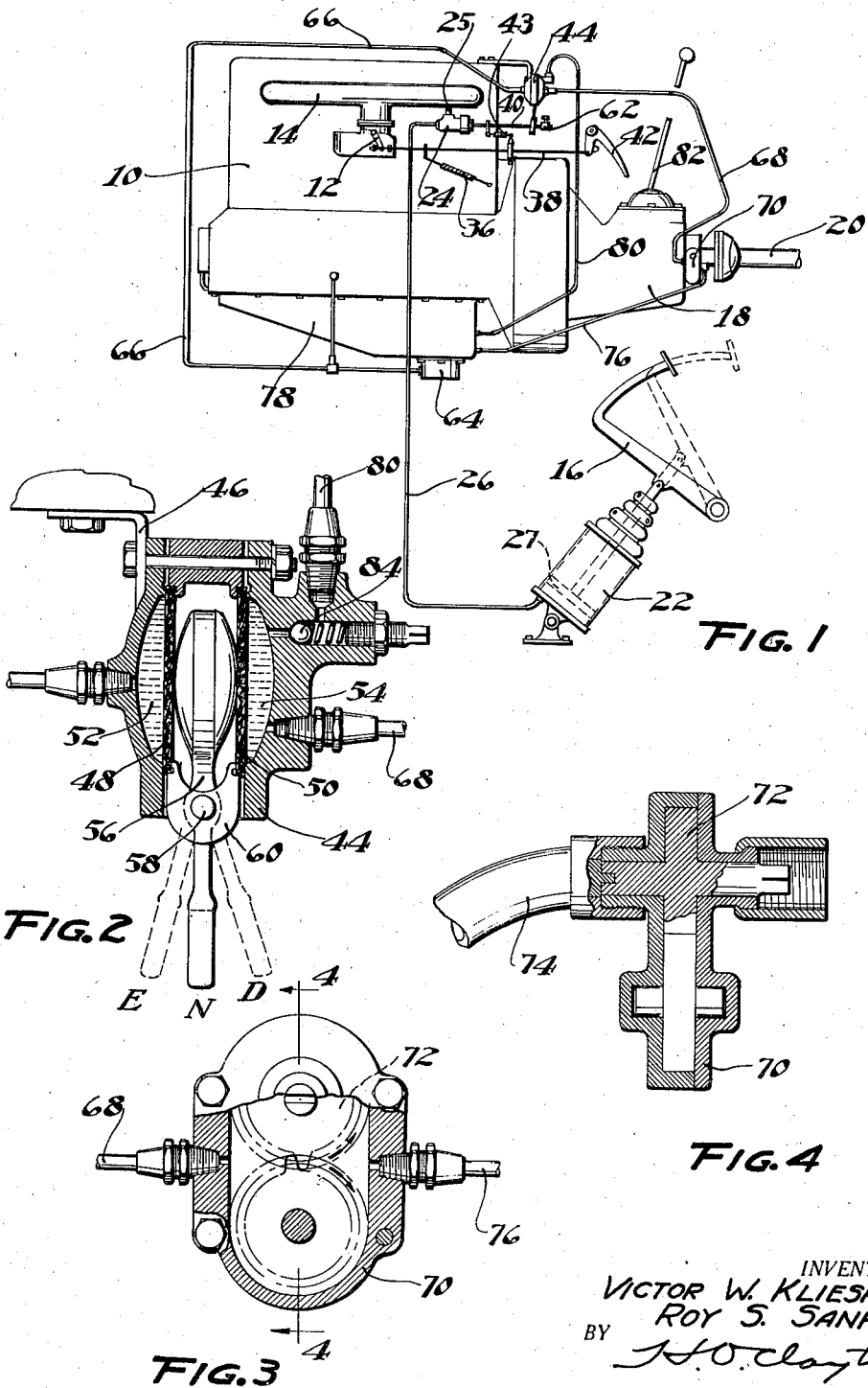
INVENTOR.
VICTOR W. KLIESRATH
ROY S. SANFORD
BY
ATTORNEY.

Oct. 25, 1938.    V. W. KLIESRATH ET AL    2,134,519
DECLUTCHING MECHANISM
Filed July 23, 1931    2 Sheets-Sheet 2

INVENTOR.
VICTOR W. KLIESRATH
ROY S. SANFORD
BY
H. O. Clayton
ATTORNEY.

Patented Oct. 25, 1938

2,134,519

UNITED STATES PATENT OFFICE 2,134,519

DECLUTCHING MECHANISM

Victor W. Kliesrath and Roy S. Sanford, South Bend, Ind., assignor to Bragg-Kliesrath Corporation, South Bend, Ind., a corporation of New York Application July 23, 1931, Serial No. 552,626

9 Claims. (Cl. 192—.01)

This invention relates in general to the driving mechanism of an automotive vehicle and in particular to means for automatically controlling the operation of the clutch.

It is the usual practice in the operation of automotive vehicles to retard the car by using the engine as a brake, that is, by closing the throttle and employing the kinetic energy of the moving vehicle to drive or pump the engine pistons with the car in gear. There is a growing tendency, however, to incorporate devices, generally of the overrunning clutch type, which allow the vehicle to overrun the engine at closed throttle to thereby coast when the R. P. M. of the engine crank shaft is reduced below that of the vehicle drive shaft. This overrunning action is usually termed "free wheeling," and is very desirable in open or level country driving, for with vehicles so equipped the engine does not act as a drag on the vehicle when the throttle is closed, thereby appreciably reducing the fuel consumption.

An object of the present invention is to provide such a free wheeling device wherein the conventional clutch is employed to perform this function.

A further object is to provide a vacuum operated power device for releasing and engaging the clutch, which device is automatically rendered operable to release the clutch at closed throttle and automatically rendered operable to engage the clutch as the throttle is opened, the engagement depending, however, upon the relative R. P. M.'s of the driving and driven elements of the clutch.

The particular object of the invention, therefore, lies in the manner of insuring, in automatically operated mechanism, a smooth clutch engagement, and more specifically to provide governor means to control the operation of the mechanism. In the preferred embodiment of the invention, the governor means functions to permit the clutch to engage when and if the R. P. M. of the driving and driven elements of the clutch become equal to each other during the several gear changing operations in accelerating the vehicle, or more generally described when the R. P. M. of the driving clutch element is equal to or greater than the R. P. M. of the driven clutch element, and in a second embodiment governor means is provided to permit engagement of the clutch during the gear shifting operation when and if the R. P. M. of the crank shaft is equal to or greater than the R. P. M. of the drive shaft. There is thus provided a governor controlled power operated means which accurately simulates the conventional manual operation of the clutch in coordination with the manual control of the throttle.

In its broadest aspect the aforementioned preferred embodiment of the invention contemplates the provision of governor means for controlling the clutch engaging operation of a clutch operating power means whereby the governor is inoperative to prevent a clutch engaging operation of the power means in starting the vehicle, the governor however becoming operative, when the vehicle is in motion, to prevent such operation when the speed of the driven clutch element exceeds that of the driving clutch element. Thus with the engine idling during a free wheeling operation of the vehicle or during a gear shifting operation the clutch may not be engaged until the engine is accelerated sufficiently to step up the speed of the driving clutch element to at least equal that of the driven clutch element. The clutch may then be quickly and smoothly engaged.

Another object is to provide a fluid pressure operated governor means for controlling the operation of the valve of the aforementioned power device, said governor means being operated by fluid pressure derived from pumps driven by either the crank and drive shafts of the vehicle or the driving and driven clutch plates.

Another object of the invention is to provide manually operable adjusting means incorporated in said fluid pressure governor means to vary the timing of the governor in its control of the clutch mechanism.

Other objects of the invention and desirable details of construction and combinations of parts will become apparent from a reading of the following description, taken in conjunction with the illustration of the invention disclosed in the accompanying drawings, in which:

Figure 1 is a diagrammatic view of the various parts of the clutch control mechanism, which parts cooperate to constitute the invention;

Figure 2 is a sectional view of the power operated synchronizing or governor unit for controlling the valve of the clutch operating mechanism;

Figure 3 is a sectional view of one of the two governor operating fluid pumps, which pump is driven by the vehicle drive shaft;

Figure 4 is a sectional view of the pump of Figure 3 taken on line 4—4 thereof;

Figure 5:
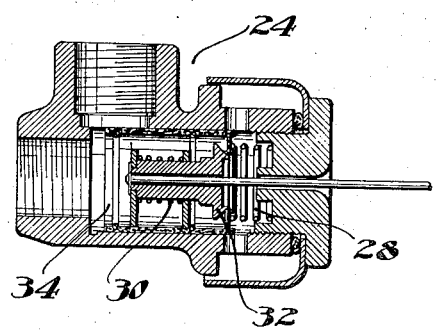

Figure 5 discloses, in section, the details of the actuator control valve; and

Figure 6:
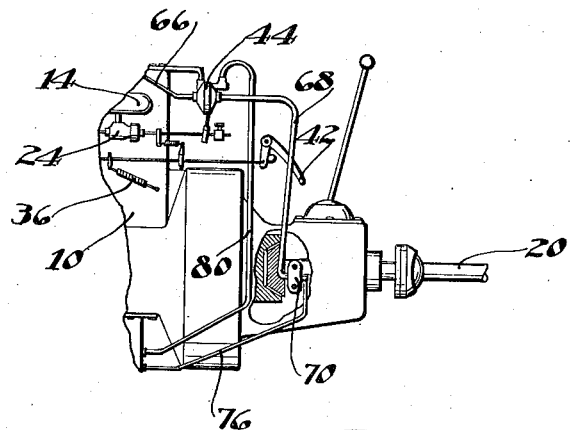

Figure 6 discloses diagrammatically a modified form of governor mechanism.

In that embodiment of the invention illustrated diagrammatically in Figure 1 there is disclosed a conventional internal combustion engine 10 having an accelerator controlled throttle 12 and an intake manifold 14. The usual clutch controlling pedal 16 and transmission 18 are shown diagrammatically, which mechanisms co-operate with the engine 10 and drive shaft 20 to propel the vehicle.

An important aspect of the invention relates to means for effecting a free wheeling operation of the vehicle by controlling the engagement and disengagement of the conventional clutch; the more specific aspect, however, concerns an automatically operated governor means for controlling the operation of a power means for operating the clutch.

With the above objects in view the conventional clutch pedal lever 16 is adapted to be actuated by a vacuum operated power actuator or servo motor 22, the actuator being rendered operative to disengage the clutch by means of the vacuum created within the manifold 14 at closed throttle, and with the engine idling. The actuator is controlled by a three-way valve 24, the operative parts of which, at closed throttle, are positioned as disclosed in Figure 5, placing the actuator in circuit via conduits 25 and 26 with the manifold to power load its piston 27 and disengage the clutch. The springs 28 and 30 of the valve are held compressed to close air valve 32 and open vacuum valve 34, by a tensioned spring 36, the latter, with the accelerator released, holding link 38 and its attached valve link 40 to the right, as disclosed in Figure 1. The spring 36 also serves to keep the butterfly of the throttle closed and the accelerator pedal 42 against its stop. The links 38 and 40 are interconnected by linkage including a spring 43, the latter functioning to permit an operation of the throttle with the link 40 held stationary by the governor mechanism. The actuator valve disclosed in detail in Figure 5 is not claimed herein, inasmuch as the same is more fully described and claimed in United States Patent No. 2,036,053, dated March 31, 1936.

Thus with the "throttle closed" position of the parts the clutch is disengaged, all as disclosed in full lines in Figure 1. With such a construction the clutch is automatically disengaged when the operator's foot is removed from the accelerator pedal 42 and the throttle closed, and likewise automatically engaged when and if the throttle is opened to further tension spring 36 and permit springs 28 and 30 to close valve 34 and open valve 32. This clutch engaging operation of the valve is, however, controlled in a manner forming the essence of the present invention, and which control will now be described in detail.

In effecting the clutch engagement it is, of course, desirable to "slip" the clutch just as little as possible, thereby eliminating wear and also the possibility of any tendency to grab. With the aforementioned mechanism it is particularly desirable to provide a non-slipping engagement with the transmission in high gear, for it is at this time that the free wheeling operation is employed to the greatest advantage.

To this end there is provided a governor for automatically controlling the operation of the actuator valve, permitting the latter to function to vent the actuator and permit clutch engagement when and if the transmission is in high gear and the R. P. M.'s of the driving and driven elements of the clutch are equal.

As disclosed in Figure 2, the governor comprises a two-part casing 44 rigidly secured to the engine casing by bracket 46, said casing parts being constructed to clamp between them flexible diaphragms 48 and 50. The casing walls and diaphragms together define fluid receiving chambers 52 and 54. Between the diaphragms there is positioned the rounded end of a lever member 56 fulcrumed at 58 in a filler member 60 secured between the parts of the casing. The lever 56 is forked at its end projecting from the casing to straddle the actuator valve link 40, the latter being provided with a stop 62 slightly spaced from the fork with the parts in the "closed throttle" position of Figure 1.

The chamber 52 receives oil under pressure from the conventional engine lubricating pump 64 via conduit 66, and chamber 54 receives oil under pressure via conduit 68 from a pump 70, the driving gear 72 of which is preferably driven by the drive shaft 20, and incidentally serves to drive the speedometer conduit 74. The gear pump 70 receives its oil supply via conduit 76 from the engine sump 78, and the oil supplied under pressure to chamber 54 is returned to the engine sump via conduit 80.

In order that the mode of operation of the governor may be made clear, it will be necessary to describe the entire cycle of operations of the various mechanisms cooperating to constitute the present invention. With both the vehicle and engine at rest, that is, with all the parts in their static condition, the oil pressure in chamber 52 will be equal to that in chamber 54, and the lever will be positioned as disclosed at N, Figure 2. Upon starting the engine, the clutch will immediately be disengaged, due to the manifold vacuum created by the idling engine and the action of this vacuum upon the piston 27. The governor lever will then assume a position somewhere between the positions N and E, Figure 2, for with the engine idling the pressure in chamber 52 will be raised above that in chamber 54. The parts are at this time in the position disclosed in Figure 1 and more completely referred to above.

The gear shift lever 82 is then operated to place the change speed gearing mechanism or transmission in low or first gear, whereupon the accelerator pedal 42 is depressed to open the throttle to effect a movement of the vehicle. The pressure in chamber 52 is accordingly increased to increase the tilt of lever 56 to the left in Figure 1. The lever, 56, however, is entirely clear of the stop 62, and accordingly has no effect upon the operation of the valve 24, which immediately vents the actuator to engage the clutch, the pedal 16 being disclosed in dotted lines in Figure 1 with the clutch engaged.

After the clutch is engaged, which is, of necessity, a slipping operation, the pressure in chamber 54 is increased to slightly move the lever counterclockwise toward position N. The pressures in chambers 52 and 54 are at all times during the cycle of operations a function of the R. P. M. of the crank and drive shafts, and with the clutch engaged and the transmission in low gear, as just described, the R. P. M. of the crank and drive shafts will be approximately two to one respectively, assuring the position of the lever 56 to the left of position N, due to the greater pressure in chamber 52.

When the desired speed of the vehicle has been attained in first gear, the foot is removed from the accelerator pedal, as is the usual mode of control, closing the throttle and automatically declutching the engine and drive shafts. The pressure in chamber 52 then drops to the idling engine pressure after the energy of the fly wheel has been dissipated and the pressure in chamber 54 becomes a function of the then existing speed of the vehicle as it coasts or free wheels. The lever 56 then assumes a position approaching D, Figure 2, due to the existing differential of pressures in the chambers.

Continuing the conventional practice, the transmission is now placed in second or intermediate gear, and the throttle opened, increasing the pressure in chamber 52 and moving the lever clockwise toward position N. The lever, however, again maintains its position ahead of the stop 62 when the crank shaft speed is equal to or greater than the drive shaft speed, the valve being then opened to its venting position by springs 28 and 30 as the throttle is advanced. The clutch is accordingly again slipped into engagement and the vehicle subsequently accelerated.

After the desired vehicle velocity is attained in second gear, the throttle is again closed preparatory to shifting into high gear, the clutch being again automatically released. The R. P. M. of the drive shaft 20 is now quite appreciable, maintaining a relatively high pressure in chamber 54 to throw the lever 56 to the extreme position D, Figure 2, the R. P. M. of the crank shaft having been reduced after the kinetic energy of the flywheel is dissipated. The transmission is now placed in high gear and the throttle opened. The lever 56 is at this time in contact with the stop 62, and the parts are so constructed and arranged that the valve 24 is permitted to open sufficiently to engage the clutch when the lever reaches the position N of Figure 2. The pressures in the two chambers are at this time equal to each other, the various parts, including the proportions of the gears of the pumps 64 and 70, being so constructed and arranged that the crank and drive shafts are at this time rotating at the same R. P. M. The position of the lever 56 to coincide with the vented position of the valve may also be varied by the adjustment of a spring loaded ball check valve 84, Figure 2, which loading determines the operating pressures in chamber 54.

The governor accordingly permits the engagement of the clutch plates when and if the crank and drive shafts are rotating at the same speed or the crank shaft speed exceeds that of the drive shaft.

Such a structure insures a speeding up of the engine before engaging the clutch with the vehicle coasting in high gear, for it is at this time that the drive shaft speed is usually high and exceeds that of the crank shaft. The aforementioned governor control is thus particularly advantageous with the automatic declutching or free wheeling structure disclosed, inasmuch as the free wheeling or coasting operation is quite often employed with the vehicle in high gear on the highways.

There is disclosed in Figure 6 a modified form of governor means wherein the pump 70 is driven directly by the driven element of the clutch, being located directly in rear of said element and in front of the change speed gearing mechanism of the transmission. With such a construction, the pressures in chambers 52 and 54 are direct functions of the R. P. M. of the driving and driven elements of the clutch, and the governor and cooperating parts are so constructed and arranged that the valve is vented to engage the clutch when the R. P. M. of the driving clutch element is equal to or greater than the R. P. M. of the driven clutch element. With such a construction the throttle must be opened sufficiently to give an engine speed sufficient to bring the driving clutch plate R. P. M. up to that of the driven plate, whereupon the actuator valve is permitted to function to vent the actuator and engage the clutch.

There is thus provided by the aforementioned construction a very effective clutch control with its attendant advantages, such advantages including both the obviating of manual clutch operation in accelerating the vehicle during the gear shifting operations and the provision of the so called "free wheeling" effect.

It will be understood that while the illustrated embodiments of the invention are described as shown, a considerable latitude is to be permitted in construction within the range of the claims.

We claim:

1. In an automotive vehicle provided with an internal combustion engine, a throttle for said engine, accelerator pedal controlled linkage for operating said throttle, a drive shaft and a clutch adapted to interconnect said engine and shaft, means for operating said clutch comprising a pressure differential operated motor, a control valve for said motor, said valve rendered operative by the actuation of said throttle, and governor means, rendered operative by said engine and drive shaft, for controlling the operation of said valve.

2. In an automotive vehicle having an internal combustion engine, an accelerator operated throttle for controlling said engine, a clutch mechanism and a drive shaft, power operated means for operating said clutch, a valve for controlling the operation of said power means, said valve being rendered operative by said throttle controlling means and a fluid operated governor adapted to control the operation of said valve, said governor being rendered operative by means driven by said engine and drive shafts.

3. In an automotive vehicle provided with a clutch, an internal combustion engine and a drive shaft, power means for operating said clutch, a valve for controlling the clutch engaging and disengaging operations of said power means, a fluid pump driven by said drive shaft and a second fluid pump driven by said engine, governor means operated by said pumps, said governor means adapted to control the clutch engaging operation of said valve to effect an engagement of the clutch when the R. P. M.'s of said engine and drive shafts are so related that the aforementioned pumps are developing equal pressures operative upon said governor.

4. In an automotive vehicle provided with a clutch having driving and driven elements and an internal combustion engine, power means for operating said clutch, a valve for controlling the clutch engaging and disengaging operations of said power means, a fluid pump driven by the crank shaft of said engine, which shaft is adapted to drive one of said clutch elements, a second fluid pump driven by the other of said clutch elements, governor means operated by said pumps, said governor means adapted to so control the operation of said valve as to effect an engagement of the clutch when the R. P. M.'s of said clutch elements are equal one to another and the aforementioned pumps are accordingly developing equal pressures operative upon said governor.

5. In an automotive vehicle provided with an internal combustion engine having a throttle and a crank shaft, an accelerator, a drive shaft, a clutch for interconnecting said shafts to drive the vehicle, power means for operating said clutch, a control valve for said power means, a governor for permitting a clutch engaging operation of said valve when and if the R. P. M. of the crank shaft is equal to or exceeds the R. P. M. of the drive shaft and for preventing a clutch engaging operation of said valve when and if the R. P. M. of the driven shaft exceeds that of the crank shaft, and linkage interconnecting said throttle, valve and accelerator, said linkage being so constructed as to permit an operation of said throttle to increase the R. P. M. of the engine when the governor is functioning to prevent a clutch engaging operation of the valve.

6. In an automotive vehicle provided with an internal combustion engine having a throttle, a manually operable member for operating the throttle, a clutch, power means for operating the clutch, a control valve for said power means, a governor mechanism operable to control the operation of said control valve, and means interconnecting said throttle, valve, governor and manually operable means whereby the throttle may be operated by the manually operable means without affecting the control of said governor over said control valve.

7. In an automotive vehicle provided with an internal combustion engine having a throttle, an accelerator for operating the throttle, a clutch, power means for operating the clutch, a control valve for said power means, a governor mechanism operable to control the operation of said control valve, and means interconnecting said throttle, valve, governor and accelerator, said interconnecting means comprising a yieldable member interconnecting said control valve and manually operable member whereby the throttle may be operated by the accelerator to the exclusion of said control valve.

8. In an automotive vehicle provided with a clutch, power means for controlling the operation of the clutch comprising a pressure differential operated motor having its power element operably connected to the clutch, valve means for controlling the clutch disengaging and engaging operations of said motor, and governor means for controlling the operation of said valve means and comprising means operative, when the vehicle is static, to permit an operation of the valve to effect an engagement of the clutch and operative, when the vehicle is in motion, to prevent an operation of the valve to effect an engagement of the clutch when the speed of the driven clutch element exceeds that of the drive clutch element.

9. Clutch control mechanism for an automotive clutch comprising a pressure differential operated motor having its power element adaptable to be operably connected to the clutch, a valve for controlling the clutch disengaging and engaging operations of the motor, stop means for controlling the operation of the valve, and automatically operable means for controlling the operation of said stop whereby the valve may be operated to effect an engagement of the clutch in starting the vehicle and the valve is rendered inoperative to permit an engagement of the clutch when the speed of the driving clutch element is less than or substantially less than the speed of the driven clutch element.

VICTOR W. KLIESRATH.
ROY S. SANFORD.